United States Patent
Bates et al.

(10) Patent No.: US 8,640,089 B2
(45) Date of Patent: *Jan. 28, 2014

(54) AUTOMATED CONSTRUCTION AND DEPLOYMENT OF COMPLEX EVENT PROCESSING APPLICATIONS AND BUSINESS ACTIVITY MONITORING DASHBOARDS

(75) Inventors: John Bates, Nashua, NH (US); Gareth Smith, Cambridge (GB); Richard M. Bentley, Essex (GB); James Arsenault, Amherst, NH (US); Aston Chan, Merrimack, NH (US); Kevin A. Palfreyman, Cambridge (GB); Robert S. Mitchell, Cambridge (GB)

(73) Assignee: Software AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,222

(22) Filed: Jul. 25, 2012

(65) Prior Publication Data
US 2012/0291008 A1   Nov. 15, 2012

Related U.S. Application Data

(63) Continuation of application No. 12/025,586, filed on Feb. 4, 2008, now Pat. No. 8,276,115.

(60) Provisional application No. 60/896,266, filed on Mar. 21, 2007, provisional application No. 60/888,500, filed on Feb. 6, 2007.

(51) Int. Cl.
*G06F 9/44* (2006.01)

(52) U.S. Cl.
USPC ........... 717/109; 717/106; 717/107; 717/113; 715/779

(58) Field of Classification Search
None
See application file for complete search history.

(56) References Cited

U.S. PATENT DOCUMENTS

| | | | |
|---|---|---|---|
| 6,727,884 B1* | 4/2004 | Leatham et al. | 345/156 |
| 6,965,368 B1* | 11/2005 | Andrews et al. | 345/156 |
| 2006/0095915 A1* | 5/2006 | Clater | 718/100 |
| 2007/0180490 A1* | 8/2007 | Renzi et al. | 726/1 |
| 2008/0163164 A1* | 7/2008 | Chowdhary et al. | 717/106 |
| 2009/0024944 A1* | 1/2009 | Louch et al. | 715/765 |
| 2011/0231790 A1* | 9/2011 | Forstall et al. | 715/779 |

OTHER PUBLICATIONS

Title: Model-Driven Dashboards for Business Performance Reporting, author: Chowdhary et al, source: IEEE, dated: 2006.*

* cited by examiner

*Primary Examiner* — Chameli Das
(74) *Attorney, Agent, or Firm* — Wilmer Cutler Pickering Hale and Dorr

(57) ABSTRACT

A system and method for constructing and deploying a business activity monitoring (BAM) dashboard associated with an event-based process are disclosed. A configuration module receives an event-based process identifier for an event-based process and data, such as inputs or outputs, for the event-based process. A generation module then generates a dashboard description that includes the identifier and an associated dashboard template having one or more dashboard components. This dashboard description is used by a dashboard server to automatically generate a BAM dashboard for monitoring the event-based process by using the association between the dashboard template and the event-based process to display data associated with the event-based process using one or more dashboard components.

15 Claims, 10 Drawing Sheets

AUTOMATED CONSTRUCTION AND DEPLOYMENT OF COMPLEX EVENT PROCESSING APPLICATIONS AND BUSINESS ACTIVITY MONITORING DASHBOARDS

CROSS REFERENCE TO RELATED APPLICATIONS

This application is a continuation of U.S. patent application Ser. No. 12/025,586, filed Feb. 4, 2008, titled "Automated Construction and Deployment of Complex Event Processing Applications and Business Activity Monitoring Dashboards", and claims priority under 35 U.S.C. §119(e) from U.S. Provisional Patent Application No. 60/888,500, titled "A Set Of Techniques and A Process to Create and Deploy, Over the Internet, Complex Event Processing (CEP) Applications that Support Rich Interactive Dashboards to Enable Business Activity Monitoring (BAM)," filed Feb. 6, 2007, and U.S. Provisional Patent Application No. 60/896,266, entitled "A Process for the Graphical Modelling, Construction and Deployment of Complex Event Processing Business Activity Monitoring Processes," filed Mar. 21, 2007, all of which are incorporated by reference herein in their entirety.

BACKGROUND

1. Field of Art

The present invention generally relates to the field of event-based computer systems, and more specifically, to constructing and deploying complex event processing (CEP) applications and business activity monitoring (BAM) dashboards.

2. Description of the Related Art

Recently, the availability and amount of real-time information has significantly increased. This allows businesses to monitor events in real-time and to automatically respond, with minimal latency, when certain events or conditions, such as threats or business opportunities, arise. However, conventional computer systems, such as database systems, are not designed for such real-time event monitoring, analysis and response. Although conventional sequential programming languages, such as C++ or Java™ allow construction of customized systems for event detection and response, constructing such an event-based system is time-intensive and the inherent sequential nature of such programming languages is not suitable for various types of real-time event monitoring, analysis and response.

Event-based computing systems allow real-time monitoring, analysis and response to various types of events. In event-based systems, incoming events are monitored for pre-defined patterns and defined actions are taken when a pattern is detected. Hence, these event-based systems support applications requiring proactive responses to patterns in changing data, such as real-time algorithmic trading, risk, compliance, telecommunications, digital battlefield applications, terrorist tracking, supply chain monitoring and logistics.

Additionally, business activity monitoring (BAM) techniques allow visualization of event patterns detected by an event-based computing system, providing real-time insights into an event flow. Business activity monitoring is any automatic monitoring of business-related events. Examples of BAM include: business activity management; the combination of business process management and historical analytics; automatically monitoring events associated with specific activities in an executing business process; monitoring business processes and generating alerts about pending and actual problems; managing aggregations, alerts and profiles to monitor relevant business metrics; real-time access to critical business performance indicators to improve the speed and effectiveness of business operations; or any software that aids in monitoring of business activities. For example, event-based computing using BAM techniques allow hedge funds to monitor trades, logistics operators to monitor locations and delays in a shipment, and surveillance personnel to detect fraudulent behavior at different devices.

However, there are no standard development tools and techniques for creating and deploying event-based BAM applications. Conventional development methods require use of a bespoke-based method, resulting in a long development cycle and a difficult to maintain system. As conventional development techniques rely on user entry of text data in a structured format, these techniques also cannot uniformly abstract multiple application or scenario types, distinguish between different input parameters and support streaming output parameters. Existing event-based BAM application construction techniques require initial development of the underlying event-based process or scenario, using a text-based event programming language having multiple syntax rules.

SUMMARY

A system for constructing and deploying a complex event processing application and a business activity monitoring (BAM) dashboard comprises a configuration module and a dashboard server adapted for communication with an event engine. The configuration module includes a generation module, a deployment module and a template storage module. The configuration module receives an event-based process identifier that describes or identifies an event-based process and data related to the event-based process, such as an input to the event-based process and/or an output generated by the event-based process. In an embodiment, the event-based process identifier also describes or identifies additional information, such as data used internally by the event-based process or associated with the event-based process. The generation module automatically associates a template stored in the template storage module with the event-based process. The template includes one or more dashboard components for displaying data associated with the event-based process. During execution of the event-based process, the dashboard components from the template are used to display data associated with the event-based process in a manner specified by in the template. This allows the template to automatically generate a BAM dashboard for monitoring data associated with event-based process without requiring user configuration of the BAM dashboard appearance or configuration of relationships between dashboard components and data associated with the event-based process.

The template storage module stores templates having a dashboard component. The template storage module is adapted to communicate with an editing module that receives data identifying or describing an event-based process. The generation module associates the event-based process with a template. For example, the generation module associates an input to the event-based process with a first dashboard component and associates an output from the event-based process with a second dashboard component characteristic for the template. This allows data from the event-based process to be displayed in a format or configuration specified by the template. By automatically associating event-based process input data and/or output data with display characteristics, the generation module allows automatic generation of a BAM dashboard for monitoring data associated with the event-based process. This simplifies BAM dashboard generation by removing the need for manual identification of what data associated with the event-based process to display and how to display the data associated with the event-based process.

A method for constructing and deploying a complex event processing application and a BAM dashboard comprises receiving an identifier for an event-based process; selecting a dashboard template including one or more dashboard components; relating data associated with the event-based process and a dashboard component; creating a deployment package, and deploying the deployment package on a server, and then using the selected dashboard template and the relationship between data associated with the event-based process and the one or more dashboard components to visually display data associated with the event-based process.

The features and advantages described in the specification are not all inclusive and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Figure 1:
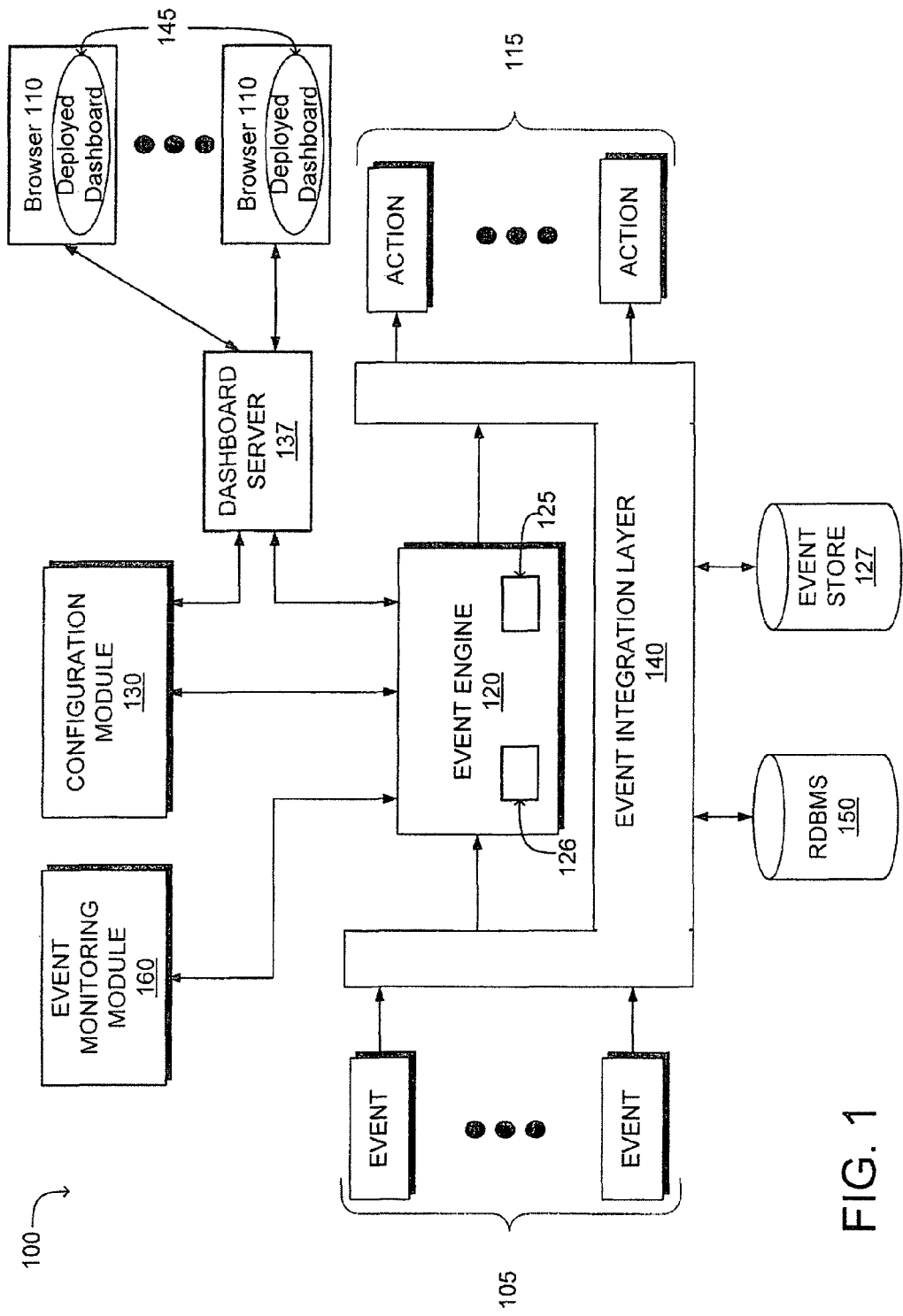
FIG. 1 is a block diagram of a distributed computing system for event processing according to one embodiment of the invention.

A system and method for configuring dashboards associated with an event-based process, such as generating or modifying a dashboard responsive to a received description of the event-based process, are described. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. While the present invention is described in the context of business application monitoring (BAM) dashboards, those skilled in the art will recognize that the present invention may also be used for configuring other types of dashboards.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

FIG. 1 is a block diagram of a distributed computing system 100 for event processing according to an embodiment of the present invention. The distributed computing system 100 comprises an event engine 120, a configuration module 130, an event integration layer 140, an event store 127, a relational database management system (RDBMS) 150 and an event monitoring module 160 coupled by a network (shown as various connecting lines between these components). The distributed computing system 100 also comprises a dashboard server 137 coupled to a plurality of client devices having a browser 110 for presenting a deployed dashboard 145. The event engine 120, the configuration module 130 and the dashboard server 137 are adapted for generating, modifying and deploying a business application monitoring (BAM) dashboard. A BAM dashboard receives data associated with an application of an event-based process from the event engine 120 and then displays the received data using one or more dashboard components, allowing visualization of the event-based process. An example BAM dashboard is further described below in conjunction with FIGS. 8A and 8B.

The event engine 120 receives input events 105 from one or more sources, such as computing devices (not shown) which include computing capabilities and data communication capabilities, and generates output actions 115 using an event-based process. Multiple computing devices are used to allow the distributed computing system 100 to process multiple input events 105 to generate multiple output actions 115. For example, different computing devices transmit different input events 105 and receive different output actions 115. The input events 105 received by the event engine 120 describe occurrences, such as an inventory level, a shipping delay or similar occurrence, or responses to detecting an event, such as invoking a service, notifying a user, initiating a process or other similar action.

In one embodiment, input events 105 are transmitted to the event engine 120 using a data packet including an event header and an event body. The event header comprises an event identifier, an event type, an event name, a time stamp and an event occurrence number. The event body comprises data describing the occurrence, for example a description of a product having sales below a threshold.

The event engine 120 can be implemented in many ways. For example, it is a software process executable by a processor (not shown) and/or a firmware application. The process and/or firmware can be configured to operate on a general purpose microprocessor or controller, a field programmable gate array (FPGA), an application specific integrated circuit (ASIC) or a combination thereof. Alternatively, the event engine 120 comprises a processor configured to process data describing events and may comprise various computing architectures including a complex instruction set computer (CISC) architecture, a reduced instruction set computer (RISC) architecture or an architecture implementing a combination of instruction sets. The event engine 120 can comprise a single processor or multiple processors. Alternatively, the event engine 120 comprises multiple software or firmware processes running on a general purpose computer hardware device. For purposes of illustration, FIG. 1 shows the distributed computing system 100 as having a single event engine; however, in various embodiments, the distributed computing system 100 includes a plurality of event engines.

The event engine 120 includes the rule store 125 having one or more event processing rules describing the event-based process. The rules are applied to the received input event 105 to generate an output action 115. In one embodiment, the rule store 125 also includes one or more states corresponding to the application of event-processing rules to input events 105. Additionally, the event engine 120 receives input from the configuration module 130 and modifies the contents of the rule store 125, such as the event processing rules or states of the event-based process, accordingly. For example, responsive to input from the configuration module 130, the event engine 120 adds additional states to the event-based process, modifies existing states of the event-based process, modifies event processing rules, adds additional event processing rules or performs similar actions.

The event engine 120 also comprises a dashboard store 126 including data used by one or more BAM dashboards. Data in the dashboard store 126 describes what information from an event-based process is output for presentation in the BAM dashboard and how data is communicated out of the event engine 120. For example, the dashboard store 126 identifies data from an event-based process for display to a user, a display format for the data from the event-based process and/or control objects for communicating data to or otherwise modifying the event-based process. In one embodiment, the dashboard store 126 also includes one or more templates describing how data from the event-based process is displayed, such as font size or type, display color or other data or instructions describing presentation of data to a user. In an embodiment, the BAM dashboard comprises a plurality of web pages and the template describes the number of web pages comprising the dashboard, the function of the various web pages and navigation between web pages within the dashboard. In one embodiment, the event engine 120 communicates data for the BAM dashboard to the dashboard server 137. In other embodiments, the event engine 120 communicates data from the dashboard store 126 to the destination of the output actions 115, the configuration module 130, the event monitoring module 160, or another device which displays data describing the event-based process or data associated with the event-based process. The dashboard store 126 allows data from the event-based process to be displayed in a specified format, such as a graphical or a tabular format, simplifying analysis or monitoring of the event-based process.

By including one or more templates, the dashboard store 126 allows dashboards to be customized for different implementations. This allows data from a single event-based process to be displayed to a user (or different users) in different formats specified by one or more templates. For example, different companies can use a single event-based process to generate output, but can associate different company-specific templates with the event-based process to allow the output data to be displayed according to individual requirements or preferences. Hence, the dashboard store 126 allows data from a single event-based process to be displayed in various formats. The dashboard store 126 can also act as a data source to allow for the aggregation of real-time data for display in complex event processing applications and BAM dashboards. The dashboard store 126 can aggregate data from the event engine 120 and transmit it to the dashboard server 137 for presentation in a BAM dashboard.

In one embodiment, the rule store 125 and/or the dashboard store 126 comprise a non-volatile storage device, such as a hard disk drive, a flash memory device or other persistent storage device. Alternatively, the rule store 125 and/or the dashboard store 126 comprise a volatile storage device such as dynamic random access memory (DRAM), static random access memory (SRAM) or another suitable memory device. In another embodiment, the rule store 125 and/or the dashboard store 126 comprise a combination of a non-volatile storage device and a volatile storage device.

The configuration module 130 includes computing capabilities and data communication capabilities. The configuration module 130 receives input and generates configuration data for controlling and modifying the event-based process. The configuration module 130 also receives input and modifies a dashboard associated with the event-based process. The configuration module 130 then transmits data, instructions or information to the event engine 120 to modify the event-based process or to the dashboard server 137 to modify the dashboard based on the configuration data. In one embodiment, the configuration module 130 also reformats the received input from a first format to a second format for the configuration data. For example, the configuration module 130 receives as input a graphical model describing one or more states of the event-based process and generates textual data formatted in an event processing language corresponding to the received graphical model. This allows a user to describe an event-based process in a simple, intuitive format, which is converted into executable data for implementation by the event engine 120. Alternatively, the configuration module 130 receives text data describing event-based process states and transitions between one or more event-based process states which is implemented by the event engine 120. The configuration module 130 is described in more detail below with reference to FIG. 2 as it relates to generating, modifying and deploying a BAM dashboard.

The event integration layer 140 receives input events 105 from one or more sources, such as computing devices, and receives one or more output actions 115 from the event engine 120. The event integration layer 140 modifies the format(s) of the input events 105 and/or output actions 115, allowing a single output format from the event engine 120 to be reformatted for use by different computing devices. Similarly, the event integration layer 140 reformats received input events 105 allowing the event engine 120 to receive data in a consistent format, regardless of the format in which input events 105 are received by the event integration layer 140. In various embodiments, the event integration layer 140 comprises one or more software or firmware processes running on a general purpose computer hardware device.

The event store 127 stores received input events 105 and/or output actions 115. In an embodiment, the event store 127 communicates with the event integration layer 140 to capture input events 105 and output actions 115. The event store 127 also is coupled to the event engine 120, allowing the event store 127 to communicate stored events to the event engine 120. In an embodiment, the event store 127 stores the captured input events 105 in a database or other structured format to expedite subsequent retrieval of the stored events. In one embodiment, the event store 127 comprises a non-volatile storage or a combination of non-volatile storage and a volatile storage.

In an embodiment, the distributed computing system 100 also includes a Relational Database Management System (RDBMS) 150 which communicates with the event integration layer 140 to access the event store 127. In another embodiment, the RDBMS 150 is directly coupled to the event store 127. The RDBMS 150 manages and maintains data stored in the event store 127. For example, the captured input events 105 and/or output actions 115 are stored as tables and the relationship between the captured input events 105 and/or output actions 115 is also stored as one or more tables. RDBMS 150 simplifies retrieval and subsequent use of stored events for event processing analysis or use of stored events as input to an event processing simulation.

In one embodiment, the event engine 120 is also adapted to communicate with an event monitoring module 160. The event monitoring module 160 receives data from the event engine 120 describing event processing. For example, as the event engine 120 applies different rules to an input event 105, the event engine 120 communicates the results of the rule application to the event monitoring module 160. The event monitoring module 160 then displays data describing the event processing for monitoring, allowing real-time monitoring of event processing. For example, the event monitoring module 160 displays a BAM dashboard associated with an event-based process, so that observing the BAM dashboard allows for monitoring of event-based process execution. An example BAM dashboard showing event-based process execution is described below in conjunction with FIG. 8B.

The event monitoring module 160 comprises any device or module configured to receive data from the event engine 120 and process the received data, such as by displaying the data or applying one or more event processing rules to the data. In one embodiment, the event monitoring module 160 comprises a cursor controller, a keyboard or keypad, a trackball, a stylus or other mechanism for communicating information and/or commands to the event engine 120. Alternatively or in addition, the event monitoring module 160 comprises a device including computing capabilities and data communication capabilities that communicates data capture or event processing simulation data to the event engine 120. Using one or more separate computing devices for the event monitoring module 160 allows the data capturing and/or simulation to occur at a location remote from the event engine 120.

In one embodiment, a network (shown generally as the lines connecting the components of FIG. 1) is used to transmit data or instructions between or among the event engine 120, configuration module 130, dashboard server 137, event integration layer 140, event store 127, RDBMS 150, event monitoring module 160 and other computing devices (not shown). The network may comprise a conventional wireless data communication system, for example, general packet radio service (GPRS), IEEE 802.11 (or WiFi), IEEE 802.16 (or WiMax), Bluetooth, or any other suitable wireless communication system. Alternatively, the network may comprise a conventional wired data communication system, such as Ethernet, digital subscriber line (DSL), integrated services digital network (ISDN), or any other suitable wired communication system. In an embodiment, the network comprises a combination of a wireless communication system and a wired communication system. Alternatively, the network is replaced by a peer-to-peer configuration where the computing devices, event engine 120, configuration module 130, event integration layer 140, event store 127 and event monitoring module 160 directly communicate with each other.

As shown in FIG. 1, the dashboard server 137 is coupled to a plurality of client devices having a browser 110 for presenting a deployed dashboard 145. The dashboard server 137 is also adapted to communicate with the configuration module 130 and the event engine 120. The dashboard server 137 includes one or more BAM dashboard templates indicating how data from an event-based process (e.g., the event engine 120) is displayed. The dashboard server 137 also maintains a BAM dashboard description for associating an event-based process with a template. For example, the dashboard server 137 includes a data table where an event-based process identifier is associated with a BAM dashboard description to indicate the event-based process providing data used by a BAM dashboard description. In one embodiment, the dashboard server 137 also identifies data from an event-based process, a display format for the data from the event-based process and/or control objects for modifying the event-based process. The dashboard server 137 receives data from the event engine 120 as an event-based process is applied to input events 105 and uses the BAM dashboard description to format the received data for display. The formatted data is then transmitted to a client device having a browser 110 to present the data in the deployed dashboard 145. The dashboard server 137 also receives a deployment package 310 (see FIG. 3) from the configuration module 130. The dashboard server 137 uses the dashboard deployment package 310 to create, configure or modify a BAM dashboard description accordingly. This also includes the ability to present and control access to the data within the event engine 120 differently for different users of the deployed dashboards 145. A dashboard server 137 provides greater scalability for the distributed computing system 100 by moving client management from the event engine 120 to the dashboard server 137. The dashboard server 137 also reduces the amount of data communicated to/from the event engine 120 by using the dashboard server 137 to modify BAM dashboard appearance or data used by a BAM dashboard. This reduction in received data decreases the frequency at which the event engine 120 is accessed by external devices, increasing security of the event engine 120. Although shown as a single server, those skilled in the art will recognize that the dashboard server 137 may alternatively be a plurality of dashboard servers, or a combination of a data server and an application server where the data server mediates access to the event engine(s) 120 and the application server manages communication and deployment of the dashboards on browsers 110 of client devices.

For purposes of illustration, FIG. 1 shows event engine 120, configuration module 130, dashboard server 137, event integration layer 140, event store 127, RDBMS 150 and event monitoring module 160 as discrete modules. However, in various embodiments, one or more of the event engine 120, configuration module 130, dashboard server 137, event integration layer 140, event store 127, RDBMS 150 and event monitoring module 160 can be combined. This allows a single module to perform the functions of one or more of the above-described modules.

Figure 2:
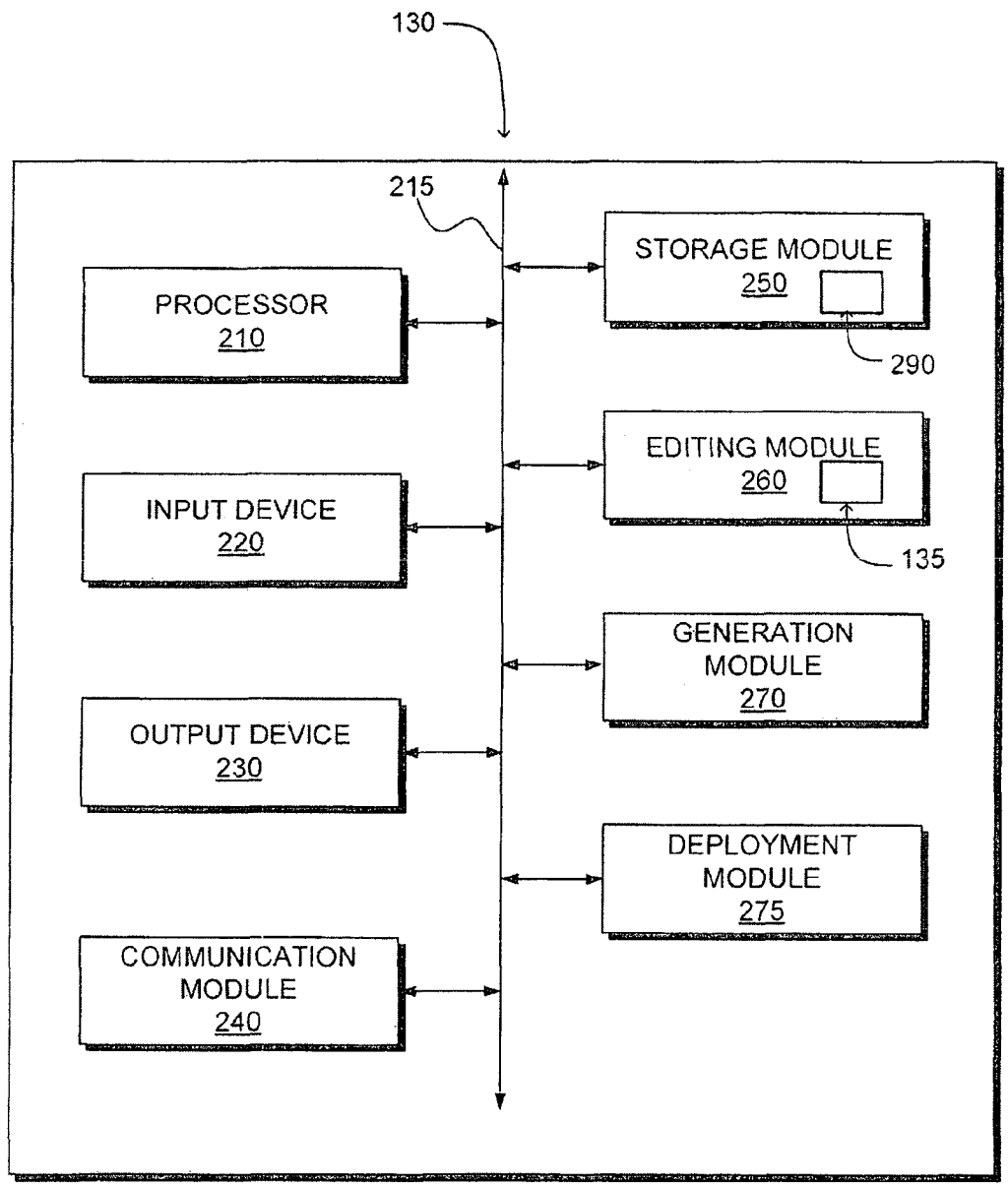
FIG. 2 is a block diagram of a configuration module for generating an event-driven BAM dashboard according to one embodiment of the invention.

FIG. 2 is a block diagram of one embodiment of the present invention showing the configuration module 130 in more detail. The configuration module 130 comprises a processor 210, an input device 220, an output device 230, a communication module 240, a storage module 250, an editing module 260, a generation module 270 and a deployment module 275 coupled by a bus 215. Those of skill in the art will recognize that different embodiments can provide the functionality of FIG. 2 in different ways. Moreover, other embodiments can include different and/or additional features and/or components than the ones described here.

The processor 210 processes data signals and may comprise various computing architectures including a complex instruction set computer (CISC) architecture, a reduced instruction set (RISC) architecture or an architecture implementing a combination of instruction sets. Although only a single processor is shown in FIG. 2, multiple processors may be included. The processor 210 comprises an arithmetic logic unit, a microprocessor, a general purpose computer, or some other information appliance equipped to transmit, receive and process electronic data from the input device 220, the output device 230, the communication module 240, the storage module 250, the editing module 260, the generation module 270 and a deployment module 275 or other components of the configuration module 130.

The input device 220 is any device configured to provide user input to the configuration module 130 such as a cursor controller or a keyboard. In one embodiment, the input device 220 comprises an alphanumeric device, such as a QWERTY keyboard, a key pad or representations of such created on a touch screen, adapted to communicate information and/or commands to the processor 210, the storage module 250, the editing module 260, the generation module 270 and a deployment module 275 or other components. In another embodiment, the input device 220 is a user input device equipped to communicate positional data as well as command selections to the processor 210 such as a joystick, a mouse, a trackball, a stylus, a pen, a touch screen, cursor direction keys or other mechanisms to cause movement adjustment of an image.

The output device 230 represents any device equipped to display electronic images and data as described herein. Output device 230 may be, for example, a light emitting diode (LED) display, liquid crystal display (LCD), cathode ray tube (CRT) display, or any other similarly equipped display device, screen or monitor. In one embodiment, output device 230 is equipped with a touch screen in which a touch-sensitive, transparent panel covers the screen of output device 230. The output device 230 displays data received from the processor 210, the input device 220, the communication module 240, the storage module 250, the editing module 260 or other components of the configuration module 130.

In an embodiment, the configuration module 130 further comprises a communication module 240 enabling the configuration module 130 to communicate with the event engine 120 and/or other devices. In an embodiment, the communication module 240 comprises a transceiver such as for infrared communication, Bluetooth communication, 3G communication, radio frequency communication, or any other wireless communication technique. In an alternative embodiment, the communication module 240 comprises a conventional wired connection, such as Ethernet, Universal Serial Bus (USB), or other wired communication techniques. Alternatively, the communication module 240 comprises both a wired connection and a transceiver. The communication module 240 allows data, commands and/or information to be distributed using network protocols, such as Transmission Control Protocol (TCP), Internet Protocol (IP), Hypertext Transmission Protocol (HTTP), or other protocols capable of communicating data or information.

The storage module 250 stores data for use by the configuration module 130. The stored data is received from the processor 210, the input device 220, the communication module 240, the editing module 260 or another suitable module. In various embodiments, the stored data is entered or provided by a user, generated by a software process executing on the configuration module 130 or any other suitable manner of data acquisition. The storage module 250 comprises a hard disk drive, a flash memory device or other suitable mass storage device. Further, the storage module 250 can include a volatile storage device, a non-volatile storage device or a combination of a non-volatile storage device and a volatile storage device.

A template storage module 290 including BAM dashboard templates is included in the storage module 250. Structured text data, such as XML data, describing one or more BAM dashboard components (e.g., data tables, graph displays, chart displays, graphical images, text boxes, labels or similar components for visually displaying data) is stored in the template storage module 290. For a subset of the BAM dashboard components, the template storage module 290 associates a graphical representation of the BAM dashboard component with structured text data describing implementation the BAM dashboard component. This allows the BAM dashboard to display performance of the event-based process using both graphical components and text-based components. Additionally, the dashboard templates associate BAM dashboard components with one or more types of data from the event-based process, allowing automatic association of data from the event-based process with a BAM dashboard component. This simplifies construction or modification of a BAM dashboard by allowing a user to specify an event-based process causing automatic association of a dashboard component with data associated with the event-based process.

The editing module 260 generates and/or displays a graphical representation of an event-based process. The editing module 260 is also used to create and modify a dashboard. The editing module 260 also receives input from the other modules 210, 220, etc. or from another suitable data source describing: 1) an event-based process, 2) a BAM dashboard, 3) modifications to an event-based process or 4) modifications to a BAM dashboard stored in the storage module 250. In one embodiment, the editing module 260 receives data describing the states and state transitions of an event-based process, generates and displays a graphical representation of the states and state transitions of the event-based process from the received input. In one embodiment, the editing module 260 also receives data modifying or specifying rules indicating the transition between states of the event-based process and modifies an existing representation of the state transition rules or generates a new representation of the state transition rules. Additionally, the editing module 260 receives input describing different BAM dashboard components, properties or characteristics of the BAM dashboard components and how the BAM dashboard components are positioned relative to each other. The editing module 260 then displays a graphical representation of the BAM dashboard based on the received input while generating or modifying structured data associated with the graphical representation of the BAM dashboard. This allows a user to further customize dashboard appearance.

The editing module 260 also includes a dashboard configurator 135 for generating or modifying a BAM dashboard associated with an event-based process. The dashboard configurator 135 associates data from a description of an event-based process with a template stored in the template storage module 290. For example, the dashboard configurator 135 associates structured text data, such as extensible markup language (XML), Java™, C++ or other text data having a structured format, describing one or more dashboard components and/or data associated with the event-based process. In particular, the dashboard configurator 135 associates XML data for a data table with outputs from the event-based process to display the event-based process outputs in a formatted data table. The dashboard configurator 135 also creates and modifies templates. In an embodiment, the dashboard configurator 135 generates a simplified configuration interface, such as described below in conjunction with FIGS. 6A and 6B, to allow a user to rapidly generate a BAM dashboard from an event-based process description. In an embodiment, the simplified configuration interface receives data describing an input to and an output from an event-based process and associates the input and/or output with one or more dashboard components from a stored dashboard template. In another embodiment, the simplified configuration interface allows a user to select one or more inputs or outputs from an event-based process for association with a dashboard component. Additionally, the simplified configuration interface allows users to select one or more dashboard templates for association with an input or output of the event-based process to customize display of data associated with the event-based process.

In an embodiment, the dashboard configurator 135 also accesses templates describing how data from the event-based process is visually displayed, such as font size or type, display color or other information or instructions describing how data is presented to a user. In an embodiment, the BAM dashboard comprises a plurality of web pages and the template describes the number of web pages comprising the dashboard, the function of the various web pages and navigation between pages within the dashboard. In another embodiment, the template also associates a data type with one or more display characteristics. For example, a template associates data classified by the event-based process as input with a dashboard component for displaying the data classified by the event-based process as input.

The dashboard configurator 135 allows automatic generation of a BAM dashboard from a description of an event-based process. For example, the dashboard configurator 135 identifies input data and output data associated with the event-based process and associates the input data and output data with one or more dashboard components. Hence, the dashboard configurator 135 determines how data from the event-based process is presented to a user after identifying a data type. This automatic determination of how to display data from the event-based process simplifies event-based process monitoring by reducing the time necessary to configure and deploy a BAM dashboard associated with the event-based process.

Figure 6A:
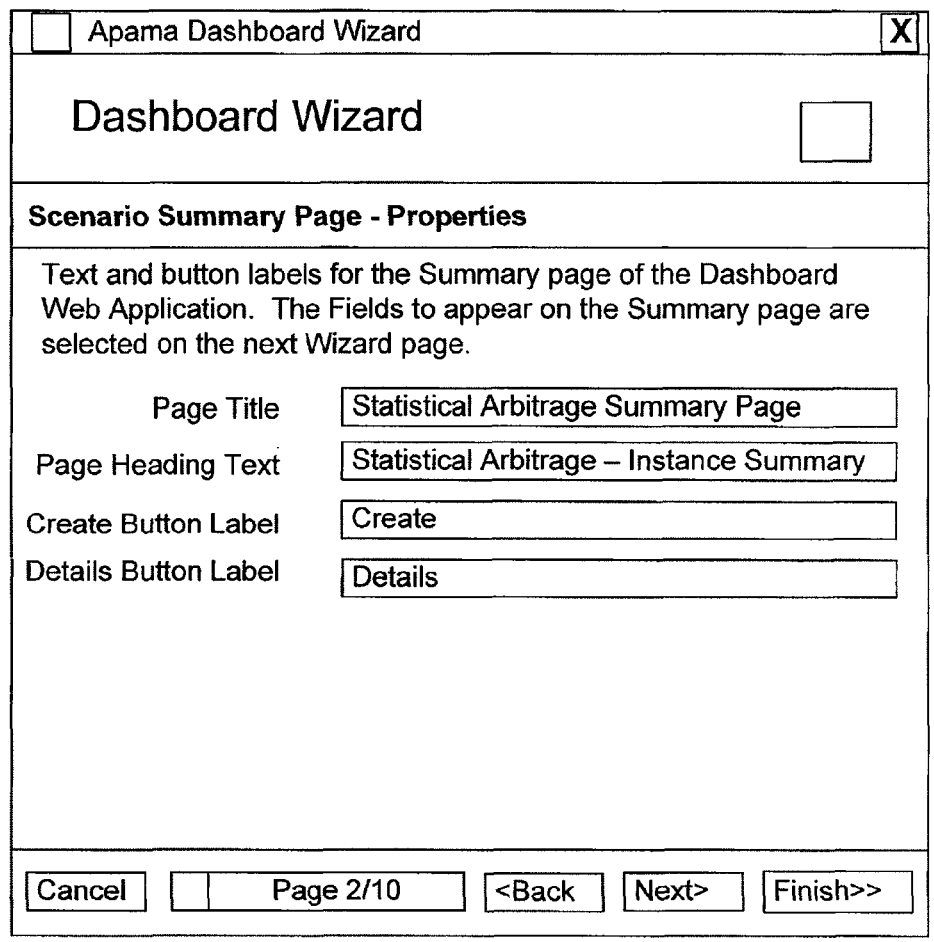
FIGS. 6A and 6B are graphic representations of example user interfaces for automatically generating a BAM dashboard according to one embodiment of the invention.
Figure 6B:
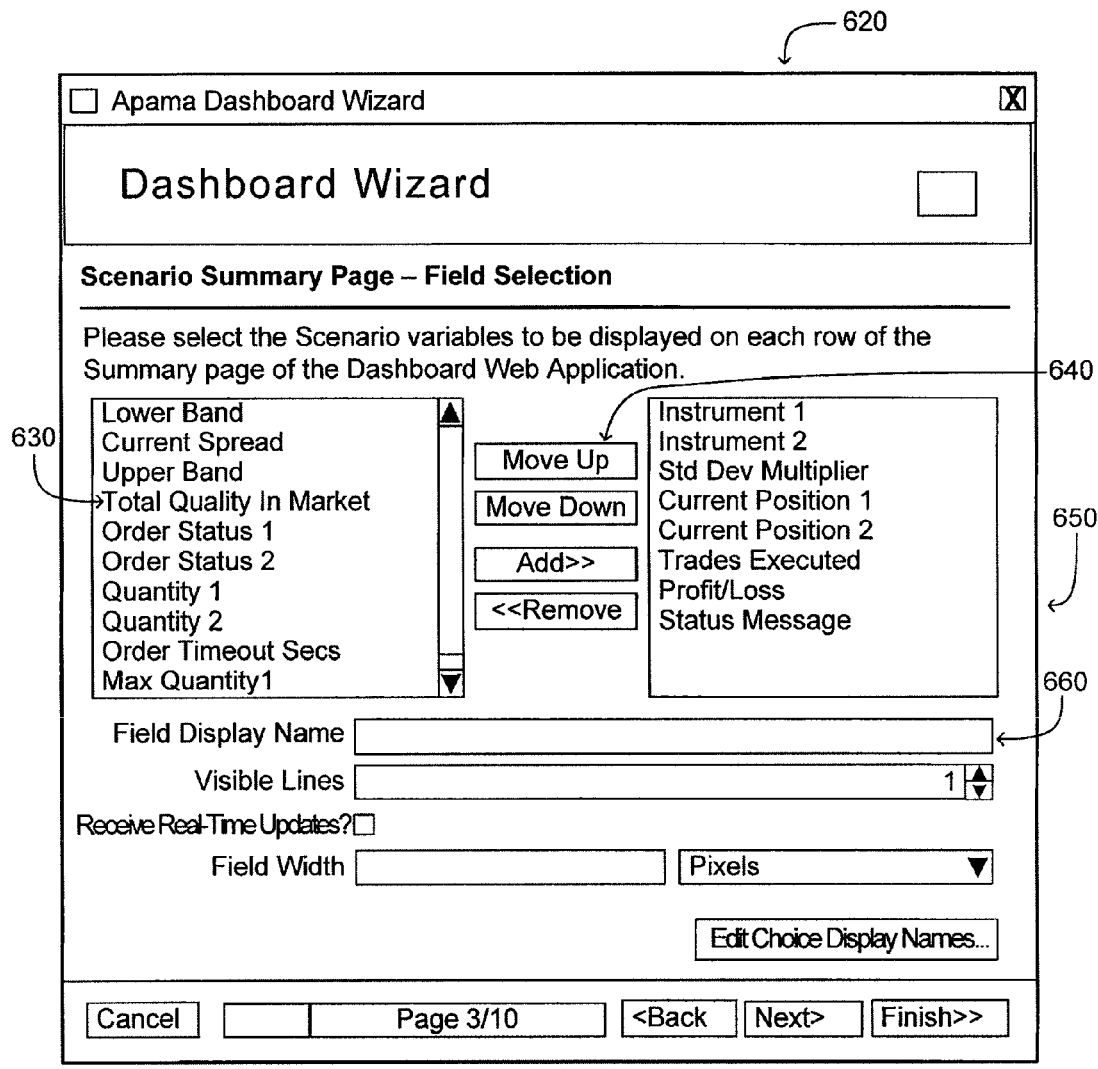

In one embodiment, the dashboard configurator 135 uses a graphical interface to automatically associate a dashboard template with an event-based process rather than require manual association of event-based process data with one or more dashboard components and manually configuration of the position of the dashboard components relative to each other. In other words, the dashboard configurator 135 acts as a software wizard to walk a user through a few steps to create a BAM dashboard. In some cases, the user can create a BAM dashboard by just inputting several mouse clicks. An example graphical interface is further described below in conjunction with FIG. 6A and FIG. 6B; however, reference to FIGS. 6A and 6B is also used to describe operation of the dashboard configurator 135 and editing module 260. For example, the dashboard configurator 135 displays a dashboard property region 610 for receiving input describing one or more overall characteristics of the dashboard, such as dashboard title, static data displayed by the dashboard or other data displayed by the dashboard but distinct from the event-based process. In an embodiment, the dashboard configurator 135 and editing module 260 also display a data selection region 620 listing a plurality of data associated with the event-based process. For example, the data selection region 620 includes a data listing 630 identifying a plurality of variable names used by the event-based process. The data listing 630 receives input from a user for selecting a subset of the data associated with the event-based process. A dashboard modification region 640 allows a user to include the selected subset of the data associated with the event-based process in the dashboard. Similarly, the dashboard modification region 640 allows a user to remove data associated with the event-based process from the dashboard. The data selection region 620 also includes a dashboard data listing 650 identifying data associated with the event-based process that is included in the dashboard. For example, the dashboard data listing 650 lists event-based process variable names that are to be displayed by the dashboard. A customization region 660 allows a user to modify one or more display characteristics associated with data included in the dashboard. For example, the customization region 660 allows a user to display a descriptive label related to data associated with the event-based process or specify a frequency in which data associated with the event-based process is updated.

The generation module 270 receives input from the editing module 260 describing an event-based process and uses that input to associate data from the event-based process with one or more dashboard components of a dashboard template. For example, the generation module 270 associates data classified as input to the event-based process with a BAM dashboard component defined in an extensible markup language (XML) schema, a Java™ applet or application, a C++ application or other structured text data. Similarly, the generation module 270 can associate data classified as output from the event-based process a BAM dashboard component described in an XML schema, a Java™ applet or application, a C++ application or other structured data. This allows automatic creation of a BAM dashboard based on an event-based process description rather than manual design of the BAM dashboard and association(s) between data from the event-based process and dashboard components as required by the prior art.

The deployment module 275 coupled to communicate with the generation module 270, the editing module 260 and the storage module 250. The deployment module 275 generates a dashboard deployment package 310 (see FIG. 3), determines a deployment environment and sends the dashboard deployment package 310 to the dashboard server 137 and the event engine 120 for deployment. In an embodiment, the deployment module 275 generates the dashboard deployment package 310 including structured text data describing the BAM dashboard components and associations between BAM dashboard components and data from the event-based process, such as input or output, for transmission to the event engine 120 and/or the dashboard server 137. In an alternate embodiment, the dashboard deployment package 310 is created by the generation module 270. The dashboard deployment package 310 simplifies remote implementation of the BAM dashboard by using a single data structure to transmit data used for BAM dashboard implementation. The deployment module 275 determines the deployment environment by identifying a server, event engine and web application that will deploy the BAM dashboard. Then the dashboard deployment package 310 is sent to these devices and used by them to install the BAM dashboard.

The editing module 260, the generation module 270 and the deployment module 275 can be implemented in many ways. For example, they can be a software process executable by processor 210 and/or a firmware application. The software and/or firmware can be configured to operate on a general purpose microprocessor or controller, a field programmable gate array (FPGA), an application specific integrated circuit (ASIC) or a combination thereof For purposes of illustration, FIG. 2 shows the editing module 260, the generation module 270 and the deployment module 275 as discrete modules. However, in various embodiments, any or all of the editing module 260, the generation module 270 and the deployment module 275 can be combined. This allows a single module to perform the functions of one or more of the above-described modules.

Figure 3:
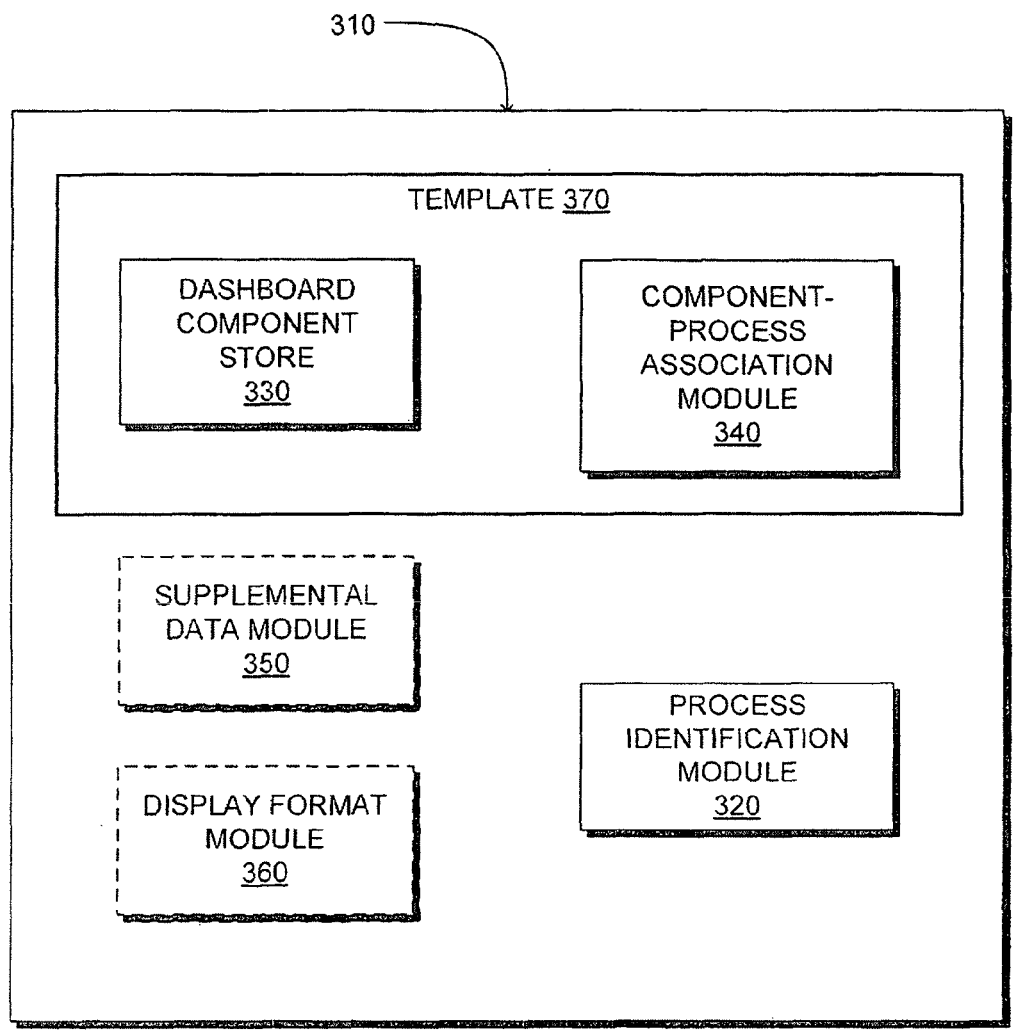
FIG. 3 is a block diagram of a deployment packet for a BAM dashboard according to one embodiment of the invention.

FIG. 3 is a block diagram of a dashboard deployment package 310 for configuring a BAM dashboard according to one embodiment of the invention. In one embodiment, the dashboard deployment package 310 includes a process identification module 320, and a template 370 formed from a dashboard component store 330 and a component-process association module 340. In another embodiment, the dashboard deployment package 310 additionally includes a supplemental data module 350 and/or a display format module 360. Those of skill in the art will recognize that different embodiments can provide the information and functionality of FIG. 3 in different ways. Moreover, other embodiments can include different and/or additional features and/or layouts than the ones described here.

The process identification module 320 identifies an event-based process or multiple event-based processes associated with a BAM dashboard. For example, the process identification module 320 identifies one or more event-based processes that communicate data to the BAM dashboard or receive data from the BAM dashboard. For example, the process identification module includes one or more event-based process identifiers such as a filename, an alphanumeric string, a numeric code or any other data which uniquely identifies an event-based process. In an embodiment, the process identification module 320 also includes an event engine identifier specifying an event engine 120 which executes the event-based process.

The dashboard component store 330 includes structured text data describing configuration and implementation of a BAM dashboard. For example, the dashboard component store 330 includes an XML schema, Java™ application, Java™ applet, C++ application or other type of data in a format suitable for execution by a processor. Hence, the dashboard deployment package 310 includes structured text data describing how the BAM dashboard is displayed and to allow implementation of the BAM dashboard using the contents of the dashboard component store 330.

The component-process association module 340 associates data in dashboard component store 330 with data from the process identification module 320. The component-process association module 340 identifies data from an event-based process that is communicated to the BAM dashboard. For example, the component-process association module 340 associates a variable name from an event-based process with a BAM dashboard component or a BAM dashboard component property. This association between event-based process variable and BAM dashboard component indicates what BAM dashboard component receives data associated with the event-based process or indicates what BAM dashboard component transmits data to the event-based process. Hence, the component-process association module 340 allows data communication between an event-based process and a BAM dashboard component or component property.

In an embodiment, the dashboard deployment package 310 also includes a supplemental data module 350 including additional data for use by the BAM dashboard, such as display text, color data or other formatting data. For example, the supplemental data module 350 includes an XML data file including predefined text data for display, data table formatting parameters, display color data or other data modifying the BAM dashboard or a BAM dashboard component. Alternatively, the supplemental data module 350 allows further input from a source other than the user or an event-based process to be used by the BAM dashboard when displaying data. Hence, the supplemental data module 350 allows additional customization of a BAM dashboard using additional display or formatting data. Alternatively, the supplemental data module 350 allows data to be shared among multiple BAM dashboards. For example, the supplemental data module 350 includes text data, color data and similar attributes which are shared among multiple BAM dashboards, allowing multiple BAM dashboards to have a similar appearance or to display similar data.

In an embodiment, the dashboard deployment package 310 also includes a display format module 360 associated with the event-based process identified by the process identification module 320. The display format module 360 includes additional data describing how to display data associated with the event-based process. For example, the display format module 360 includes one or more static or dynamic images, hypertext markup language (HTML) or extensible markup language (XML) formatting data, cascading style sheets (CSS) describing fonts, color, spacing or other data describing a look and feel of a BAM dashboard. Additionally, the display format module 360 includes a client identifier associating display characteristics and format such as in a style sheet with one or more computing devices. For example, the display format module 360 associates a corporate style sheet with a range of internet protocol (IP) addresses so computing devices associated with the range of IP addresses use the corporate template to display data from the event-based process. This allows data from a single event-based process to be displayed in multiple formats described by multiple dashboard style sheets.

For purposes of illustration, FIG. 3 shows the process identification module 320, the dashboard component store 330, the component-process association module 340, the supplemental data module 350 and the display format module 360 as discrete modules. However, in various embodiments, any or all of the process identification module 320, the dashboard component store 330, the component-process association module 340, the supplemental data module 350 and/or the display format module 360 can be combined. This allows a single module to perform the functions of one or more of the above-described modules.

System Operation

Figure 4:
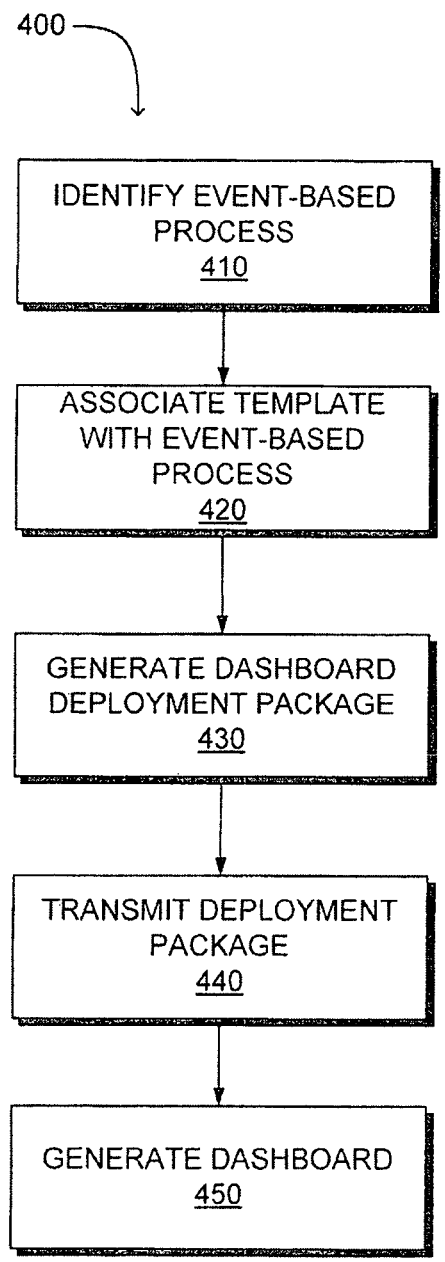
FIG. 4 is a flow chart of a method for generating and deploying a BAM dashboard according to one embodiment of the invention.

FIG. 4 is a flow chart of a method 400 for configuring an event-driven BAM dashboard according to one embodiment of the invention. Those of skill in the art will recognize that other embodiments can perform the steps of FIG. 4 in different orders or include different and/or additional steps than the ones described herein.

Initially, one or more event-based processes are identified 410 based on input from the dashboard configurator 135. For example, a user provides an event-based process identifier, such as an alphanumeric string associated with an event-based process or a filename of an event-based process. Identification of an event-based process specifies the data source for one or more BAM dashboard components or the destination for data from one or more BAM dashboard components. As the BAM dashboard visually depicts the performance of an event-based process, identification 410 of the event-based process determines what data is displayed by the BAM dashboard. For example, the event-based process identifier specifies one or more inputs to the event-based process and/or one or more outputs from the event-based process. In an embodiment, the event-based process identifier also describes one or more values used internally by the event-based process, allowing the BAM dashboard to display data describing one or more states of the event-based process in addition to the event-based process input or output. In an embodiment, multiple event-based processes are identified 410, allowing BAM dashboard components to display data from multiple event-based processes so a single BAM dashboard monitors performance of multiple event-based processes.

After identifying one or more event-based processes, the dashboard configurator 135 or the generation module 270 associates 420 a BAM dashboard template from the template storage module 290 with the identified event-based process to produces a BAM dashboard specification. In an embodiment, the association generates a relationship between data associated with the event-based process and one or more dashboard components. For example, input to the event-based process is associated 410 with a text box dashboard component or output from the event-based process is associated with a table or chart dashboard component. In an embodiment, the BAM dashboard template includes default relationships between one or more event-based process data types and one or more dashboard components. For example, the BAM dashboard template includes a default relationship between event-based process input and a data table dashboard component or a default relationship between event-based process output and a chart dashboard component. These default relationships allow the BAM dashboard template to automatically determine a data source associated with one or more dashboard components, simplifying BAM dashboard design. The BAM dashboard template also includes data describing the relative position of the BAM dashboard components to each other. Additionally, the BAM dashboard template specifies values for one or more BAM dashboard component properties, such as dashboard component sizes, dashboard component names, dashboard component display characteristics (e.g., alignment, font size, font type, color or similar data affecting visual presentation) or other data describing visual appearance of one or more BAM dashboard components.

A dashboard deployment package 310 is then generated 430 from the received BAM dashboard specification. Structured data associated with the BAM dashboard is retrieved from the template storage module 290 and included in the dashboard deployment package 310. The generated dashboard deployment package 310 also includes an event-process identifier corresponding to the one or more identified event-based processes and data describing a relationship between event-based process data and one or more dashboard components (e.g., specifying what event-based process data is displayed by a BAM dashboard component or what event-based process variable receives data from a BAM dashboard component). Therefore, the generated dashboard deployment package 310 includes data which is formatted for execution and/or display by the dashboard server 137, the event engine 120 or another computing device. For example, the dashboard deployment package 310 includes Java™, C++ or other data format suitable for execution by a processor that displays the BAM dashboard when executed.

Alternatively, the dashboard deployment package 310 includes data describing modifications to a BAM dashboard component of a BAM dashboard component property. In another embodiment, the dashboard deployment package 310 also includes supplemental data, such as BAM dashboard component properties, a location of an additional data source for a BAM dashboard component or additional formatting data affecting visual presentation of the BAM dashboard.

The generated dashboard deployment package 310 is then transmitted 440 by the communication module 240 to the dashboard server 137 which generates 450 the BAM dashboard. The dashboard server 137 serves the BAM dashboard to browsers 110 for review and manipulation by the users. Alternatively, the dashboard deployment package 310 is transmitted 440 to the event engine 120 which generates 450 the BAM dashboard. In one embodiment, the generated dashboard deployment package 310 is transmitted 440 to a plurality of event engines 120 or to a plurality of dashboard servers 137, allowing a centralized configuration module 130 to modify or configure a BAM dashboard used by multiple event engines 120 or dashboard servers 137. If a dashboard server 137 implements the BAM dashboard identified by the dashboard deployment package 310, the BAM dashboard is modified responsive to the contents of the dashboard deployment package 310; if an event engine 120 or dashboard server 137 does not implement the identified BAM dashboard, the dashboard deployment package 310 is discarded. Alternatively, user input at the configuration module 130 selects one or more event engines 120 and/or dashboard servers 137 and the dashboard deployment package 310 is transmitted 440 to the selected event engines 120 and/or dashboard servers 137. In another embodiment, event engines 120 or dashboard servers 137 periodically transmit data identifying a BAM dashboard to the configuration module 130, which determines if the identified BAM dashboard has been modified and transmits 440 a dashboard deployment package 310 to the event engines 120 or the dashboard servers 137 if necessary. Hence, a single configuration module 130 configures one or more BAM dashboards implemented by event engines 120 or dashboard servers 137 in multiple locations.

In an embodiment where the BAM dashboard is generated by a dashboard server 137, security of the event engine 120 is increased. Receiving dashboard specifications and modifying dashboard specifications via the dashboard server 137 reduces the amount of data communicated to the event engine 120 and reduces the frequency with which data on the event engine 120 is accessed. Additionally, using a dashboard server 137 limits data transmission from the event engine 120 by using a centralized dashboard server 137, rather than separate client devices, to generate the BAM dashboard.

Figure 5:
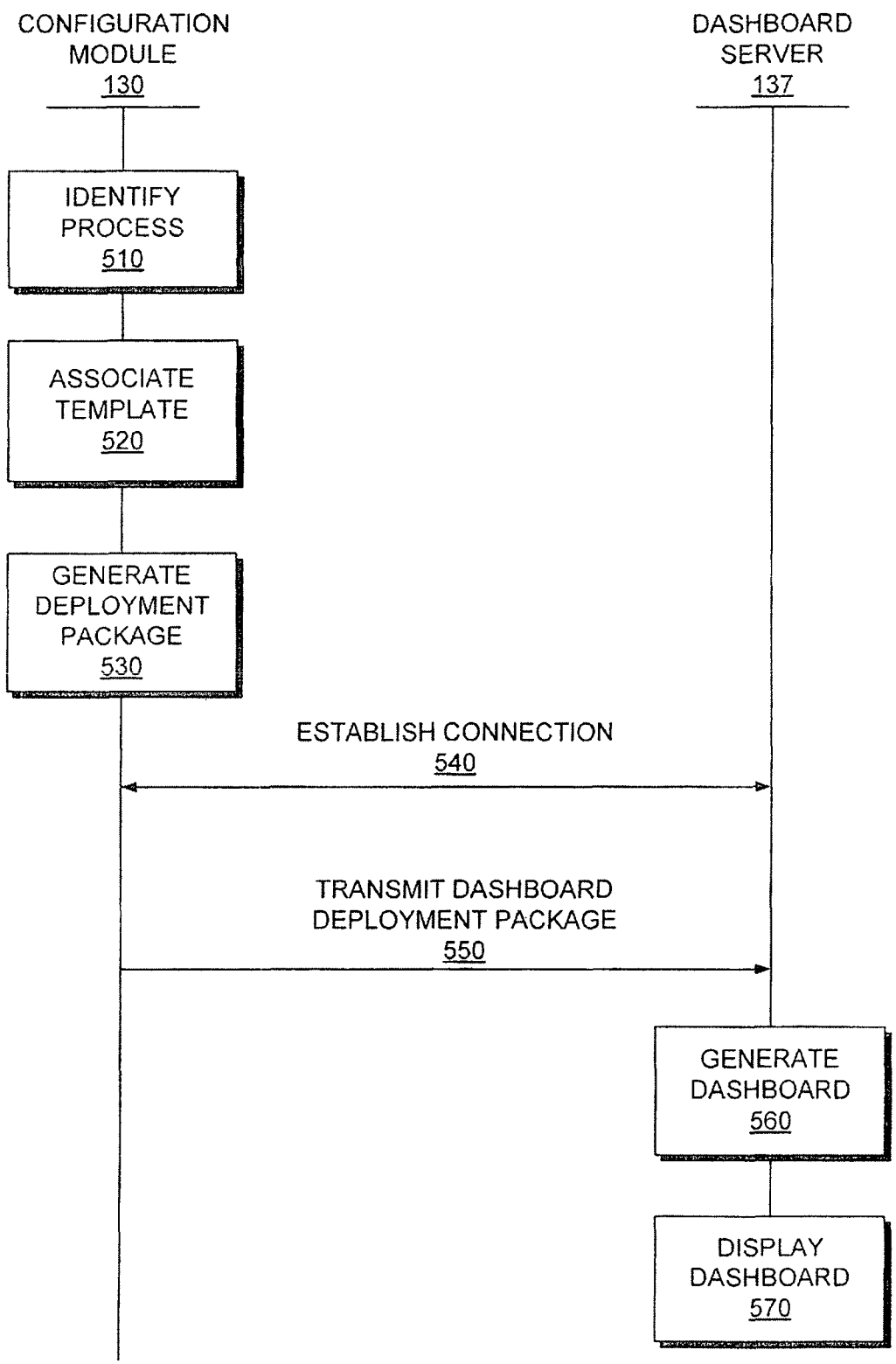
FIG. 5 is a trace diagram of the method for generating and deploying a BAM dashboard in a distributed computer system according to one embodiment of the invention.

FIG. 5 is an event diagram of BAM dashboard configuration in a distributed computer system according to one embodiment of the invention. For purposes of illustration, FIG. 5 depicts events occurring on a configuration module 130 and a dashboard server 137. However, in other alternate embodiments, the described events may occur on a configuration module 130 and an event engine 120. While process is described as being performed by the configuration module 130 generally, the process steps may be performed by the components of the configuration module 130 as has been described above.

The configuration module 130 first identifies 510 one or more event-based processes. As the BAM dashboard displays data describing execution of one or more event-based processes, identification 510 of an event-based process determines where the BAM dashboard receives data or where the BAM dashboard transmits data. For example, the configuration module 130 receives an alphanumeric identifier associated with an event-based process or a filename and/or location of an event-based process.

A BAM dashboard template is then associated 520 with the identified event-based process or event-based processes. For example, the configuration module 130 associates 520 a BAM dashboard template from the template storage module 290 with an identified event-based process. The BAM dashboard template describes the position of the BAM dashboard components relative to each other and associates data from the event-based process with one or more BAM dashboard components. Additionally, the BAM dashboard template also includes BAM dashboard component parameters describing how one or more BAM dashboard components are displayed or additional formatting data, such as web page layouts, static or dynamic image data or other data affecting visual presentation of the BAM dashboard.

The configuration module 130 then generates 530 a dashboard deployment package 310 using the BAM dashboard template associated 520 with the identified event-based process. Hence, the configuration module 130 includes an event-based process identifier, associations between data from the event-based process and BAM dashboard components, structured text data describing BAM dashboard components and the position of BAM dashboard components relative to each other and additional data modifying visual presentation of the dashboard in the dashboard deployment package 310. This allows the event-based process to be quickly monitored by generating a BAM dashboard from the data included in the dashboard deployment package 310.

A connection, such as a data connection, is then established 540 between the configuration module 130 and a dashboard server 137. In one embodiment, the configuration module 130 and dashboard server 137 reside at remote locations. This allows a single configuration module 130 to modify or configure BAM dashboards implemented by multiple dashboard servers 137.

The generated dashboard deployment package 310 is then transmitted 550 from the configuration module 130 to the dashboard server 137 using the established connection. The dashboard server 137 then configures 560 the BAM dashboard using the data in the dashboard deployment package 310. For example, the dashboard server 137 generates a new BAM dashboard or modifies an existing BAM dashboard (e.g., alters existing BAM dashboard components, modifies BAM dashboard component properties, adds additional BAM dashboard components, removes BAM dashboard components or similar modifications) responsive to the received dashboard deployment package 310. This allows the dashboard server 137 to efficiently modify or configure a BAM dashboard upon receiving a dashboard deployment package 310 from the configuration module 130 rather than requiring additional data processing or reformatting by the dashboard server 137.

After configuring the dashboard, the dashboard server 137 generates 570 the configured BAM dashboard including data describing one or more event-based processes identified by the dashboard deployment package 310.

In certain embodiments, the dashboard deployment package 310 is also sent from the configuration module 130 to the event engine 120. The dashboard deployment package 310 is used by the event engine 120 to affect changes to the data it outputs to the dashboard server 137.

Those of skill in the art will recognize that in various embodiments one or more of the methods described in FIG. 4 and FIG. 5 are implemented in hardware and/or software or combinations thereof. For example, instructions for performing one or more of the above-described methods are embodied or stored within a computer readable medium.

User Interface

FIGS. 6A and 6B are example user interfaces for automatically generating a BAM dashboard according to one embodiment of the invention. Those of skill in the art will recognize that different embodiments can provide the information and functionality of FIG. 6 in different ways. Moreover, other embodiments can include different and/or additional features and/or layouts than the ones described here. In this embodiment, the user interfaces are part of a software wizard that allows the user to package and deploy a dashboard to a web server using only a few inputs e.g., mouse clicks.

As shown in FIG. 6A, a first interface showing a dashboard property region 610 receives input from a user describing one or more overall characteristics of the dashboard, such as dashboard title, static data displayed by the dashboard or other data displayed by the dashboard but not associated with the event-based process. For example, the dashboard property region 610 allows a user to specify a dashboard title, heading information displayed by the dashboard and to identify one or more buttons or other input devices to allow a user to interact with the generated dashboard. Hence, the dashboard property region 610 allows a user to specify a descriptive or easily-identifiable title for the dashboard, simplifying subsequent analysis of data displayed using the dashboard.

As shown in FIG. 6B, a second interface showing a data selection region 620 lists a plurality of data associated with the event-based process. For example, the data selection region 620 includes a data listing 630 including a plurality of variable names used by the event-based process. The data listing 630 receives input from a user to select a subset of the data associated with the event-based process. This allows user customization of the data displayed by the dashboard based on selection of data associated with the event-based process. This allows modification of the dashboard to only display data associated with the event-based process that is most relevant to a particular implementation. Hence, rather than displaying all data associated with an event-based process, the data listing allows a user to identify specific data associated with the event-based process most relevant to a particular implementation or scenario.

A dashboard modification region 640 receives input from the user to include selected data from the data listing 630 in the dashboard. Similarly, the dashboard modification region 640 allows a user to remove data associated with the event-based process from the dashboard. This allows the user to further modify the appearance of the dashboard by removing data initially to be displayed by the dashboard.

The data selection region 620 also includes a dashboard data listing 650 identifying data associated with the event-based process to be displayed by the dashboard. For example, the dashboard data listing 650 lists of event-based process variable names associated with a dashboard component for visual presentation to a user. Hence, the dashboard data listing 650 allows a user to quickly identify what data associated with the event-based process is to be displayed by the dashboard. In an embodiment, a user selects a value from the dashboard data listing 650 then uses the dashboard modification region 640 to prevent the selected value from being displayed by the dashboard.

A customization region 660 allows a user to modify one or more display characteristics associated with one or more dashboard components. For example, the customization region 660 allows a user to display a descriptive label along with to data associated with the event-based process or specify a frequency in which the dashboard accesses the event-based process to update data being displayed. Hence, the customization region 660 allows a user to further modify or customize the dashboard by specifying data display or data modification characteristics.

Figure 8A:
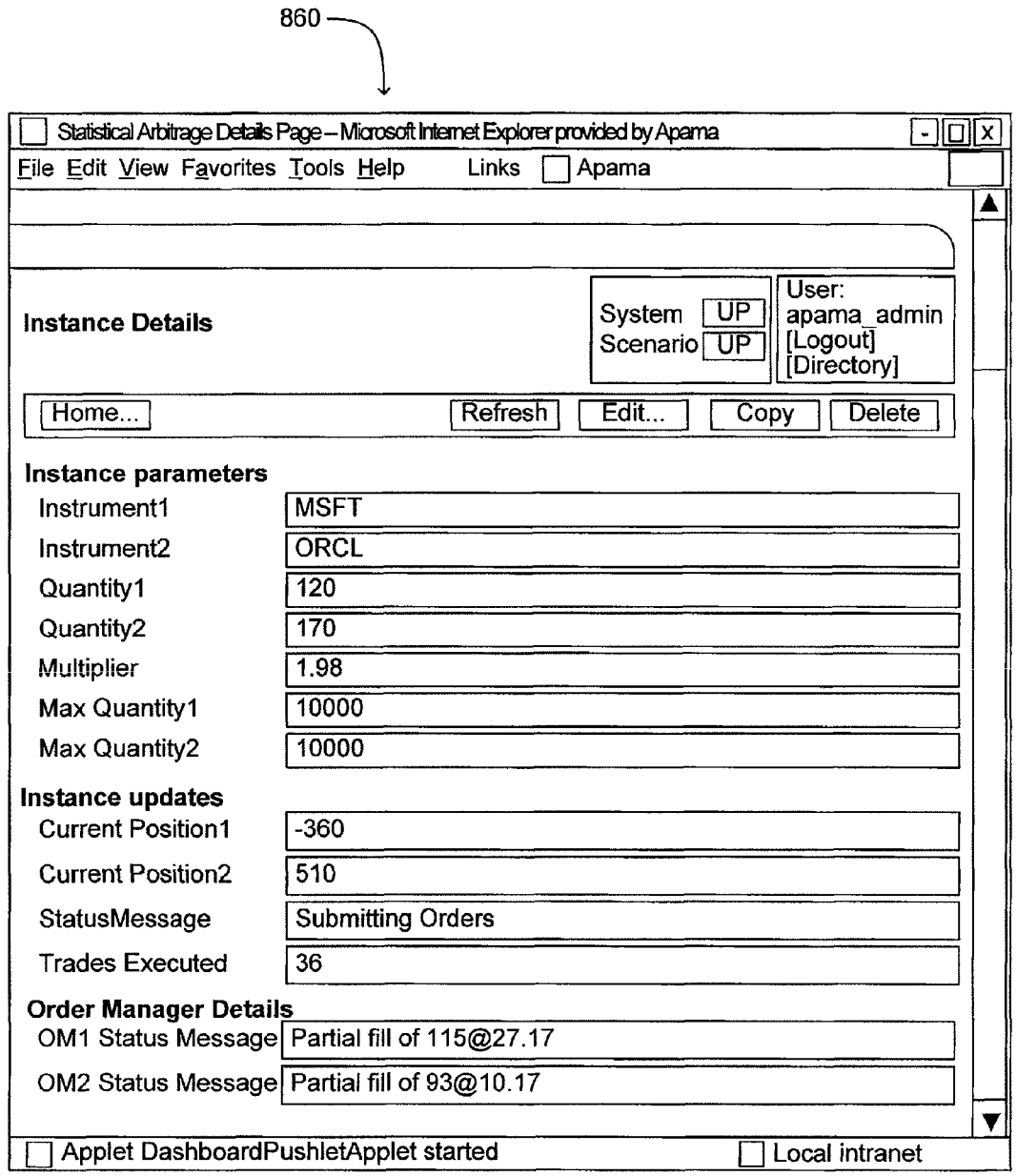
FIG. 8A is a graphical representation of an example dashboard generated for real time event visualization.

FIG. 8A is a graphical representation of an example interface 860 generated for real time event visualization. In one embodiment, the interface 860 is web based and may be provided for presentation in the browser 110. The present invention, in particular, the configuration module 130, uses the interface 860 to gather input related to an event process. The configuration module 130 and the dashboard server 137 then cooperate to automatically generate the BAM dashboard of FIG. 8B. For example, the configuration module 130 and the dashboard server 137 automatically group data, determine where on the page or grid to present the data, the format for the display of the data, and bind the event-based process and its related data to the template.

Figure 8B:
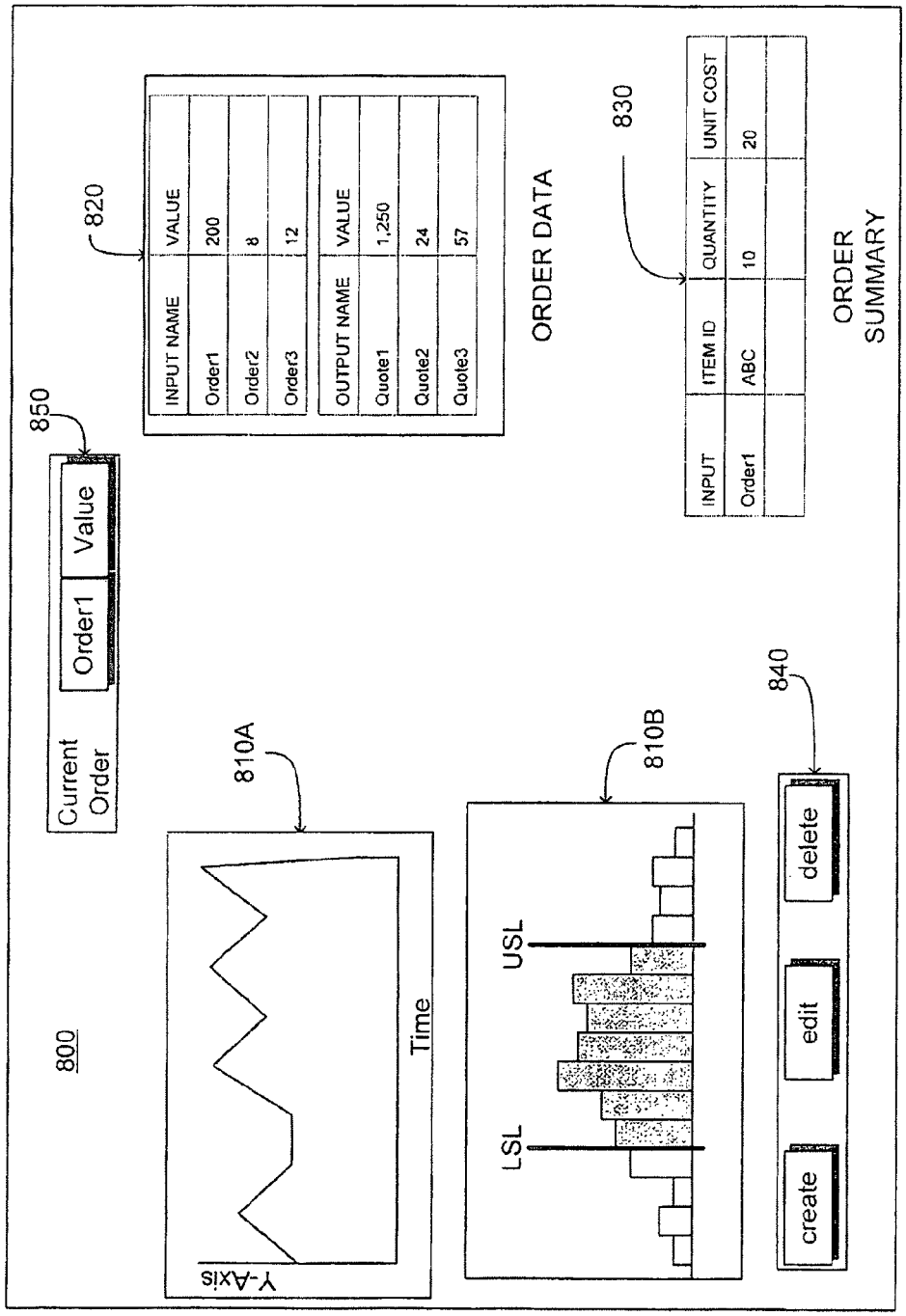
FIG. 8B is a graphical representation of an example user interface for a BAM dashboard according to one embodiment of the invention.

FIG. 8B is graphical representation of a user interface 800 displaying an example BAM dashboard according to one embodiment of the invention. Those of skill in the art will recognize that different embodiments of the BAM dashboards can provide the information and functionality of FIG. 8B in different ways. Moreover, other embodiments can include different and/or additional features and/or layouts than the ones described here.

A historical data view 810 graphically displays performance of an event-based process over a time interval. For purposes of illustration, FIG. 8B shows a BAM dashboard including two historical data views 810A, 810B; however, in other embodiments, the BAM dashboard includes greater or fewer historical data views 810. In an embodiment, the BAM dashboard specification identifies data from the event-based process that is displayed and how the identified data is displayed (e.g., a chart type). For example, historical data view 810B graphically depicts the number of orders received by the event-based process and the order volume corresponding to the received orders as a bar graph while view 810A shows the data in a line chart. Modification of the BAM dashboard specification affects the amount or type of data displayed by a historical data view 810. For example, modifying the BAM dashboard specification causes the historical data view 810 to display a different type of data from the event-based process or causes the time interval displayed by the historical data view 810 to change (e.g., from hours to days, from days to weeks, from weeks to months or a similar change to the quantity of data displayed).

A data view 820 displays data from the event-based process. The BAM dashboard specification identifies data from the event-based process for display in the data view 820. For example, the BAM dashboard specification includes a variable name from the event-based process and how data associated with the identified variable name is displayed. In an embodiment, the BAM dashboard specification also includes a variable description indicating text displayed in the data view 820, such as the variable name or a description of the data associated with the variable name. Hence, the data view 820 displays data generated or used by the event-based process, allowing a user to monitor or analyze specific event-based process data. In one embodiment, the data view 820 also displays a description or identifier associated with the data, simplifying determination of what is represented by the displayed data.

A summary view 830 displays an action, or a description of an action, generated as output by the event-based process. Hence, the summary view 830 describes the final result generated by application of the event-based process while the data view 820 describes different data used by the event-based process in generating the final result. In an embodiment, additional data, such as a description of the input event, is displayed by the summary view 830 in addition to the generated action.

An input region 840 receives input from a user, allowing the user to modify the BAM dashboard display by modifying the BAM dashboard specification. Additionally, the input region 840 allows a user to identify BAM dashboard components of particular interest and display the identified BAM dashboard components. For example, the input region 840 allows the user to modify the historical data view 810 to display different data included in the BAM dashboard specification or to generate a new historical data view 810 by specifying data for display and a time interval over which data is displayed. Alternatively, the input region 840 receives user input modifying the data displayed by the summary view 830 and/or the data view 820.

A value entry region 850 receives input from a user that is communicated to the event engine 120 for processing by the event-based process. This allows the user to provide additional data to the event engine 120, such as values for variables used by the event-based process or provide an input event for processing by the event engine 120.

Example Application

Figure 7:
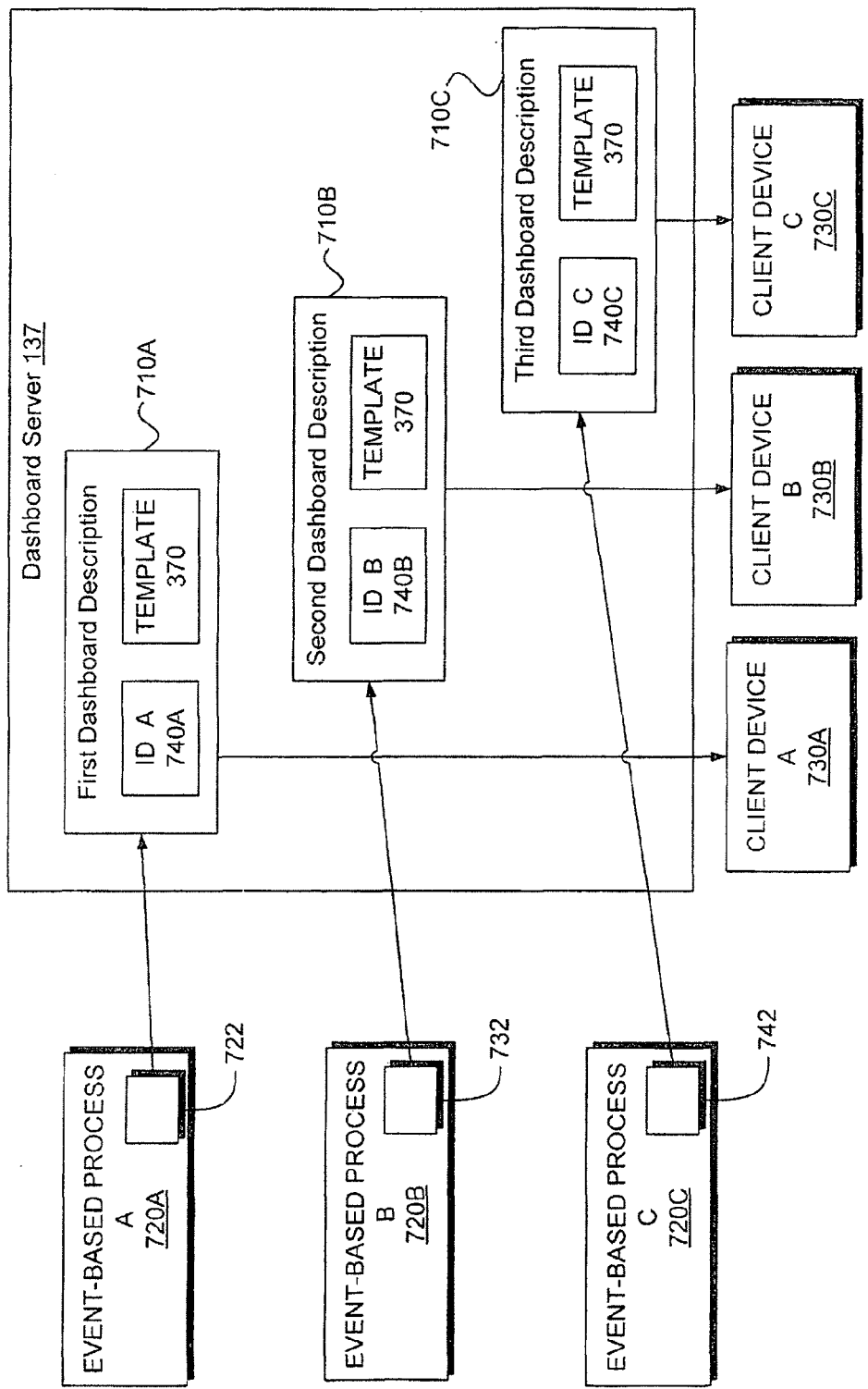
FIG. 7 is a block diagram of the dashboard server generating a plurality of BAM dashboards for a plurality of clients according to one embodiment of the invention.

FIG. 7 is a block diagram of the dashboard server 137 generating a plurality of BAM dashboards for a plurality of clients 730A, 730B and 730C, according to one embodiment of the invention. FIG. 7 illustrates a first, second and third dashboard descriptions 710A, 710B and 710C each using the same template 370 to monitor execution of multiple event-based processes 720A, 720B and 720C. The present invention is particularly advantageous because it allows the template 370 to be created and reused. For example, a user may spend a significant amount of time and effort developing a template to present information from several event-based processes. This template may then be used (and modified) by others to create BAM dashboards customized to their needs and tastes. Furthermore, the template structure allows users to create libraries or groups of templates that can be used as required.

To monitor execution of multiple event-based processes 720A, 720B, 720C, the dashboard server 137 installs a first, second and third dashboard descriptions 710A, 710B and 710C. Each of the first, second and third dashboard descriptions 710A, 710B and 710C has an event-process identifier 740A, 740B and 740C and an associated template 370. The event-process identifier 740A, 740B and 740C identifies a corresponding event-based process A, B and C, and specifying what data to retrieve from each event-based process 720A, 720B, 720C. The dashboard descriptions 710A, 710B and 710C are then used to generate BAM dashboards to present event data on the client devices 730A, 730B and 730C. Those skilled in the art will recognize that even though only one template 370 is shown, the dashboard descriptions 710A, 710B and 710C may use different templates, or includes a plurality of templates.

As the event-based processes 720A, 720B, 720C process events, data 722, 732, 742 is communicated from the event-based processes 720A, 720B, and 720C to the dashboard server 137. The dashboard server 137 receives the data 722, 732, 742 and formats the received data according to BAM dashboard component properties and associations between BAM dashboard components and event-based process data in the first, second and third dashboard descriptions 710A, 710B and 710C. This allows data 722, 732, 742 from different event-based processes 720A, 720B, and 720C to be similarly formatted according to the template 370 of their respective dashboard descriptions 710A, 710B and 710C, thereby, allowing data from multiple event-based processes 720A, 720B, and 720C to have a similar visual presentation. In another embodiment, BAM dashboards having a different visual appearance specified by different dashboard templates are generated to separately display data 722, 732, 742 from each event-based process 720A, 720B, and 720C. Although each event-based process 720A, 720B, and 720C is shown as outputting its data to a respective dashboard descriptions 710A, 710B and 710C, those skilled in the art will recognize that a particular dashboard description may receive data from a plurality of event-based process 720A, 720B, and 720C, and such data is presented according to the template included as a part of that particular dashboard description.

After formatting the received data 722, 732, 742, the BAM dashboard specified in the template 370 is displayed on one or more client devices 730A, 730B and 730C, allowing one or more users to monitor execution of the different event-based processes 720A, 720B, 720C. As the event-based processes 720A, 720B, 720C modify data 722, 732, 742, the displayed dashboard is updated to reflect the data modifications. Thus, a single template 370 allows a user to specify how multiple event-based processes 720A, 720B, 720C are monitored and presented. Those skilled in the art will recognize that in another embodiment where the client devices 730A, 730B, 730C are displaying the same event-based process, the dashboard descriptions 710A, 710B, 710C provide control over presentation and access of data within the event engine 120. Each of the client devices 730A, 730B, 730C can display deployed dashboards 145 showing different information and allowing different control.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A non-transitory computer readable storage medium comprising computer executable instructions that, when executed by a computer, cause the computer to automatically generate a dashboard on a display to display an event-based process, the computer executable instructions being further configured to cause the computer to:

receive an identifier identifying the event-based process;

in response to receiving the identifier, automatically generate a deployment package that identifies the event-based process and includes a template associating data of the event-based process with an automatically generated dashboard component, wherein the template includes a default relationship between an event-based process data type and the dashboard component, wherein the default relationship is used to automatically determine a data source associated with the automatically generated dashboard component;

receive event-based process data corresponding to the event-based process from the data source associated with the automatically generated dashboard component;

generate the dashboard using the deployment package and the event-based process data; and provide the dashboard to the display for display of the event-based process.

2. The non-transitory computer readable storage medium of claim 1 wherein the identifier includes at least one of:

an input to the event-based process;

an output generated by the event-based process; and information used internally by the event-based process.

3. The non-transitory computer readable storage medium of claim 1 wherein the deployment package further comprises display characteristics for the event-based process data.

4. The non-transitory computer readable storage medium of claim 1 wherein the instructions are further configured to cause the computer to store a plurality of templates in a memory.

5. The non-transitory computer readable storage medium of claim 1 wherein the instructions are further configured to cause the computer to:
   receive configuration data that is input using the dashboard;
   transmit information to modify the event-based process; and
   modify the dashboard based on the configuration data.

6. The non-transitory computer readable storage medium of claim 1 wherein the instructions are further configured to cause the computer to receive an input, the input used to at least one of:
   modify the dashboard component, and
   modify a relationship between the event-based process and the template.

7. The non-transitory computer readable storage medium of claim 1 wherein the instructions are further configured to cause the computer to use the template to generate a business activity monitoring dashboard.

8. The non-transitory computer readable storage medium of claim 1 wherein the dashboard component is selected from the group consisting of a data table, a graph display, a chart display, a graphical image, a text box, and a label.

9. A non-transitory computer readable storage medium comprising computer executable instructions that, when executed by a computer, cause the computer to automatically generate a dashboard to display an event-based process, the computer executable instructions being further configured to cause the computer to:
   receive an identifier identifying the event-based process and data associated with the event-based process;
   receive a template having a dashboard component specifying what and how data is displayed in the dashboard and a default relationship between an event-based process data type and the dashboard component;
   generate, in response to receiving the identifier, a relationship between the data associated with the event-based process and the template; and
   output the relationship and the identifier identifying the event-based process, wherein the default relationship is used to automatically determine a data source associated with the dashboard component, wherein the data to be displayed by the dashboard component is received from the determined data source.

10. The non-transitory computer readable storage medium of claim 9 wherein the instructions are further configured to cause the computer to store a plurality of templates in a memory, each template having a dashboard component specifying what and how data is displayed in the dashboard.

11. The non-transitory computer readable storage medium of claim 9 wherein the template comprises a business activity monitoring dashboard.

12. The non-transitory computer readable storage medium of claim 9 wherein the instructions are further configured to cause the computer to receive an input, the input being used to at least one of:
    modify the dashboard component of the template, and
    modify the relationship between the event-based process and the dashboard component.

13. The non-transitory computer readable storage medium of claim 12 wherein the input comprises a selection of a subset of the data associated with the event-based process and an association between the subset of the data associated with the event-based process and the dashboard component.

14. The non-transitory computer readable storage medium of claim 9 wherein the instructions are further configured to cause the computer to generate a dashboard deployment package, the dashboard deployment package including the identifier, structured text data describing the template, and the relationship between the event-based process and the template.

15. The non-transitory computer readable storage medium of claim 9 wherein the instructions are further configured to cause the computer to send the dashboard deployment package to at least one of an event engine and a dashboard server for deployment.

* * * * *